US012326128B2

(12) United States Patent
Edwards et al.

(10) Patent No.: US 12,326,128 B2
(45) Date of Patent: Jun. 10, 2025

(54) FUEL INJECTOR, NEEDLE SEAL, AND FUEL INJECTOR SYSTEM

(71) Applicant: Cummins Inc., Columbus, IN (US)

(72) Inventors: Romaine O. Edwards, Greenwood, IN (US); Jason R. Garcia, Franklin, IN (US); Steve W. Gillespie, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/720,790

(22) PCT Filed: Dec. 20, 2022

(86) PCT No.: PCT/US2022/082010
§ 371 (c)(1),
(2) Date: Jun. 17, 2024

(87) PCT Pub. No.: WO2023/133034
PCT Pub. Date: Jul. 13, 2023

(65) Prior Publication Data

US 2025/0052219 A1 Feb. 13, 2025

Related U.S. Application Data

(60) Provisional application No. 63/266,438, filed on Jan. 5, 2022.

(51) Int. Cl.
*F02M 47/02* (2006.01)
*F02M 55/00* (2006.01)
*F02M 63/00* (2006.01)

(52) U.S. Cl.
CPC .......... *F02M 47/02* (2013.01); *F02M 55/004* (2013.01); *F02M 63/0054* (2013.01)

(58) Field of Classification Search
CPC ... F02M 47/02; F02M 55/004; F02M 63/0054
(Continued)

(56) References Cited

U.S. PATENT DOCUMENTS 3,159,350 A 12/1964 Mangold
5,979,803 A 11/1999 Peters et al.
(Continued)

FOREIGN PATENT DOCUMENTS

DE 102005042786 B4 3/2007
DE 102014219199 A1 * 3/2016 ........... F02M 47/027
(Continued)

OTHER PUBLICATIONS

International Search Report and Written Opinion for International patent application No. PCTUS202282010, filed Dec. 20, 2022, mailed May 3, 2023, 10 pgs.

*Primary Examiner* — Mahmoud Gimie
(74) *Attorney, Agent, or Firm* — Taft Stettinius & Hollister LLP

(57) ABSTRACT

A fuel injector including a flow balanced injector needle seal is provided. The fuel injector includes a needle in a fuel passage of the fuel injector body. The needle moves longitudinally in the fuel passage to selectively stop and start fuel injection from the fuel passage. The fuel injector includes a check valve assembly that maintains pressurized fuel in the fuel passage and permits fuel flow out of the fuel passage in response to a fuel injection event. The needle seal is provided between the check valve assembly and a sleeve that extends around the proximal end of the needle. The needle seal includes multiple inlet orifices for receiving a fuel flow into the needle seal that are positioned relative to one another so that net lateral forces on the needle are effectively offset from one another.

20 Claims, 4 Drawing Sheets

(58) Field of Classification Search
USPC .......................................................... 123/445
See application file for complete search history.

(56) References Cited

U.S. PATENT DOCUMENTS

| | | | | |
|---|---|---|---|---|
| 7,353,806 | B2 | 4/2008 | Gant | |
| 8,333,178 | B2 | 12/2012 | Harcombe | |
| 2007/0034819 | A1 | 2/2007 | Mitsumata et al. | |
| 2012/0012681 | A1 | 1/2012 | Peters et al. | |
| 2013/0112767 | A1 * | 5/2013 | Mahmood ............ | F02M 47/027 239/11 |
| 2015/0152827 | A1 | 6/2015 | Rochas | |
| 2016/0010606 | A1 | 1/2016 | Rauznitz | |
| 2018/0363616 | A1 | 12/2018 | Primus et al. | |

FOREIGN PATENT DOCUMENTS

| | | | |
|---|---|---|---|
| EP | 1552135 | B1 | 6/2006 |
| EP | 3146194 | B1 | 7/2019 |
| WO | 84/01980 | A1 | 5/1984 |

* cited by examiner

FUEL INJECTOR, NEEDLE SEAL, AND FUEL INJECTOR SYSTEM

CROSS-REFERENCE TO RELATED APPLICATION

The present application is a national stage application of International Patent Application No. PCT/US22/82010, filed Dec. 20, 2022, which claims priority to, and the benefit of the filing date of, U.S. Provisional Application Ser. No. 63/266,438 filed on Jan. 5, 2022, and the contents of both are incorporated herein by reference in their entirety

FIELD OF THE DISCLOSURE

The present disclosure relates generally to a fuel injection system for an internal combustion engine and, more particularly, to a fuel injector with a flow balanced fuel injector needle seal.

BACKGROUND

Some fuel injector includes an elongated needle that moves longitudinally in a housing to alternately provide fuel injection and to close the injector under pressure. The high pressure environment under which such fuel injectors operate can induce wear on the needle, needle sleeve, and nozzle. Undesired movement, which is possible, can result in cavitation and slower response. Therefore, there remains a need for the unique apparatuses, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

The present disclosure includes a unique needle seal for a fuel injector and fuel injection system for an internal combustion engine. The needle seal includes multiple inlet orifices located about the needle seal such that pressurized fuel coming into the needle seal imparts net zero lateral forces, or substantially net zero lateral forces, on the part of the fuel injector needle located within the needle seal. The balancing of the lateral forces reduces wear on the needle and fuel injector components, and improves injector responsiveness and performance.

In an embodiment, a needle seal for a needle of a fuel injector is provided that includes a cylindrical body having a distal side and a proximal wall opposite the distal side. The cylindrical body includes a sidewall defining a control volume for receiving a proximal end of the needle with the distal side of the sidewall having an opening into the control volume. The cylindrical body includes an outlet orifice through the proximal wall that is in fluid communication with the control volume. The cylindrical body also includes multiple inlet orifices through the sidewall that each open into the control volume.

In an embodiment, a fuel injector is provided. The fuel injector includes an elongated injector body defining a longitudinally extending fuel passage therein. The fuel injector also includes an elongated needle in the fuel passage of the injector body, with the elongated needle including a proximal end and an opposite distal end. The elongated needle is longitudinally movable in the fuel passage to selectively stop and start fuel injection from the fuel passage. The fuel injector includes a sleeve positioned around an outer surface of the needle adjacent the proximal end, and a check valve assembly configured for maintaining pressurized fuel in the fuel passage and permitting fuel flow out of the fuel passage in response to a fuel injection event. The fuel injector includes a needle seal between the check valve assembly and the sleeve. The needle seal is positioned around the proximal end of the needle. The needle seal includes a first inlet orifice and an opposite second inlet orifice for receiving a fuel flow therethrough in response to the fuel injection event.

In an embodiment, a fuel injection system includes a common fuel rail and at least one fuel injector in fluid communication with the fuel rail. The fuel injector includes an elongated injector body defining a longitudinally extending fuel passage therein. The fuel injector also includes an elongated needle in the fuel passage of the injector body, and the elongated needle includes a proximal end and an opposite distal end. The elongated needle is longitudinally movable in the fuel passage to selectively stop and start fuel injection from the fuel passage. The fuel injector includes a sleeve positioned around an outer surface of the needle adjacent the proximal end, and a check valve assembly for maintaining pressurized fuel in the fuel passage and permitting fuel flow out of the fuel passage in response to a fuel injection event. The fuel injector also includes a needle seal between the check valve assembly and the sleeve. The needle seal is positioned around the proximal end of the needle. The needle seal includes a first inlet orifice and an opposite second inlet orifice for receiving a fuel flow therethrough in response to the fuel injection event.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

Figure 1:
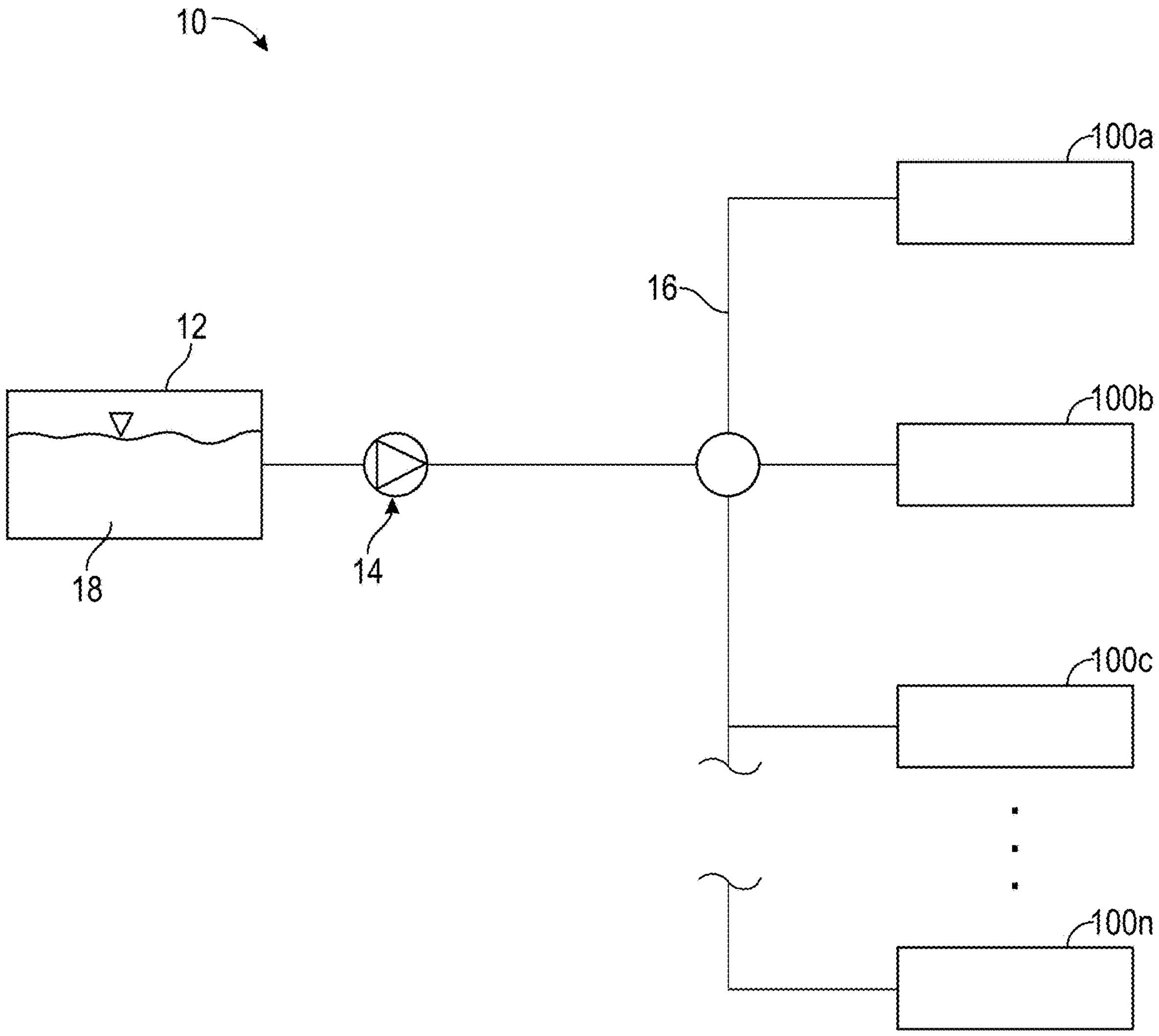
FIG. 1 is a schematic view of a fuel injection system.
Figure 2:
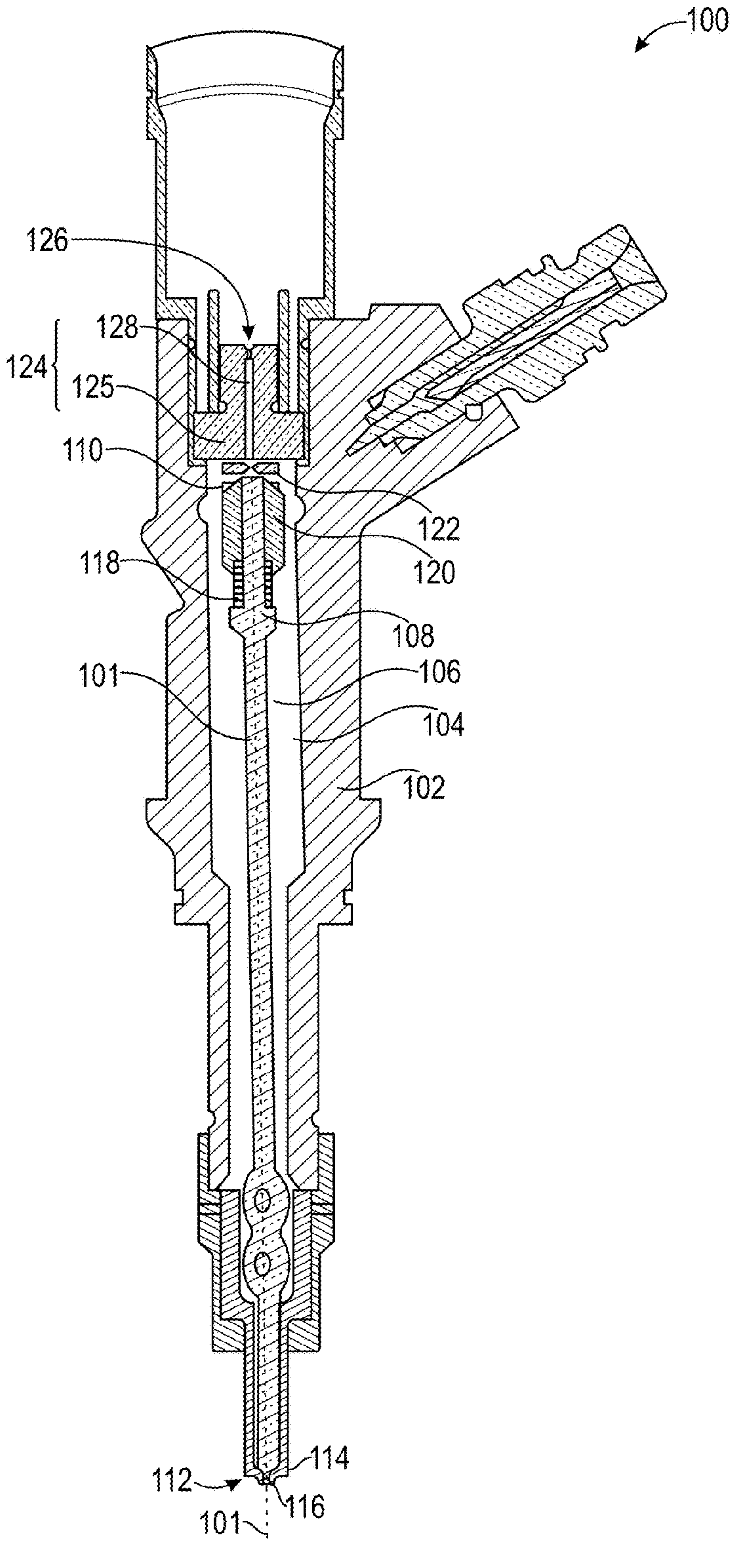
FIG. 2 is a sectional view illustrating certain aspects of an example fuel injector for an internal combustion engine, according to an embodiment of the present disclosure.

With reference to FIG. 1, there is illustrated a fuel injection system 10 including at least one fuel injector 100*a*,

100*b*, 100*c* . . . 100*n* for an internal combustion engine. The at least one fuel injector 100*a*, 100*b*, 100*c* . . . 100*n* is in fluid communication with a common fuel rail 16. The fuel injection system 10 may also include a fuel source 12 containing a fuel 18, and a fuel pump 14 to feed common fuel rail 16 and distribute fuel to the injectors 100*a*, 100*b*, 100*c* . . . 100*n*. Although multiple fuel injectors are shown schematically in FIG. 1, system 10 may include any number of fuel injectors, including one fuel injector. Pressurized fuel 18 is supplied to each of the fuel injectors 100*a*, 100*b*, 100*c* . . . 100*n* by the fuel pump 18 and distributed under pressure via the common fuel rail 16. In the discussion that follows, fuel injectors 100*a*, 100*b*, 100*c* . . . 100*n* are described with reference to a fuel injector 100, such as shown in FIG. 2.

In the illustrated embodiment, the fuel injector 100 includes an elongated injector body 102, an elongated needle 108, a sleeve 120, a check valve assembly 124, and a needle seal 122. Needle seal 122 includes multiple inlet orifices to admit fuel into the needle seal 122 while a proximal end of the elongated needle 108 is positioned within the needle seal 122.

Injector body 102 extends along a central longitudinal axis 101 and includes a body chamber 104 that is defined by the injector body 102. The body chamber 104 defines a longitudinally extending fuel passage 106 that receives elongated needle 108 therein. Sleeve 120 and needle seal 122 are also located in fuel passage 106 and positioned around an outer surface of the elongated needle 108. The needle 108 is elongated between a proximal end 110 and a distal end 112 of needle 108. Sleeve 120 is located around the needle 108 adjacent to proximal end 110, and needle seal 122 is positioned around proximal end 110 of needle 108.

The needle 108 moves up and down longitudinally in the fuel passage 106 to selectively start and stop fuel injection from the fuel passage 106. The distal end 112 of the needle 108 is located at a distal portion of the injector body 102, which defines a needle seat 114 that seats a tip 116 of the needle 108 in between fuel injection events. For example, during a fuel injection event, the needle 108 is lifted off the needle seat 114 so that fuel is injected into an engine cylinder (not shown). A needle spring 118 surrounding a portion of the needle 108 is provided in the fuel passage 106 to control longitudinal movement of the needle 108. Sleeve 120 sits atop of the needle spring 118.

In an example embodiment, needle seal 122 (discussed in further detail below) is positioned around the proximal end 110 of the needle 108 and surrounds an outer surface 109 of the needle 108. Check valve assembly 124 includes a seat 125 that is seated atop of the needle seal 122. The check valve assembly 124 is configured to normally maintain the pressurized fuel in the fuel passage 106 to seat the needle 108, and to permit fuel to flow out of the fuel passage 106 in response to a fuel injection event to unseat the needle 108. For example, in response to a fuel injection event, the check valve assembly 124 includes a check valve 126 that opens to allow fuel flow out of fuel passage 106 through a fuel flow passage 128 of the seat 125, allowing the needle 108 to move proximally in the fuel passage 106 and into the needle seal 122. The check valve 126 closes to allow fuel passage 106 to be pressurized with fuel and seat the needle 108

Figure 3:
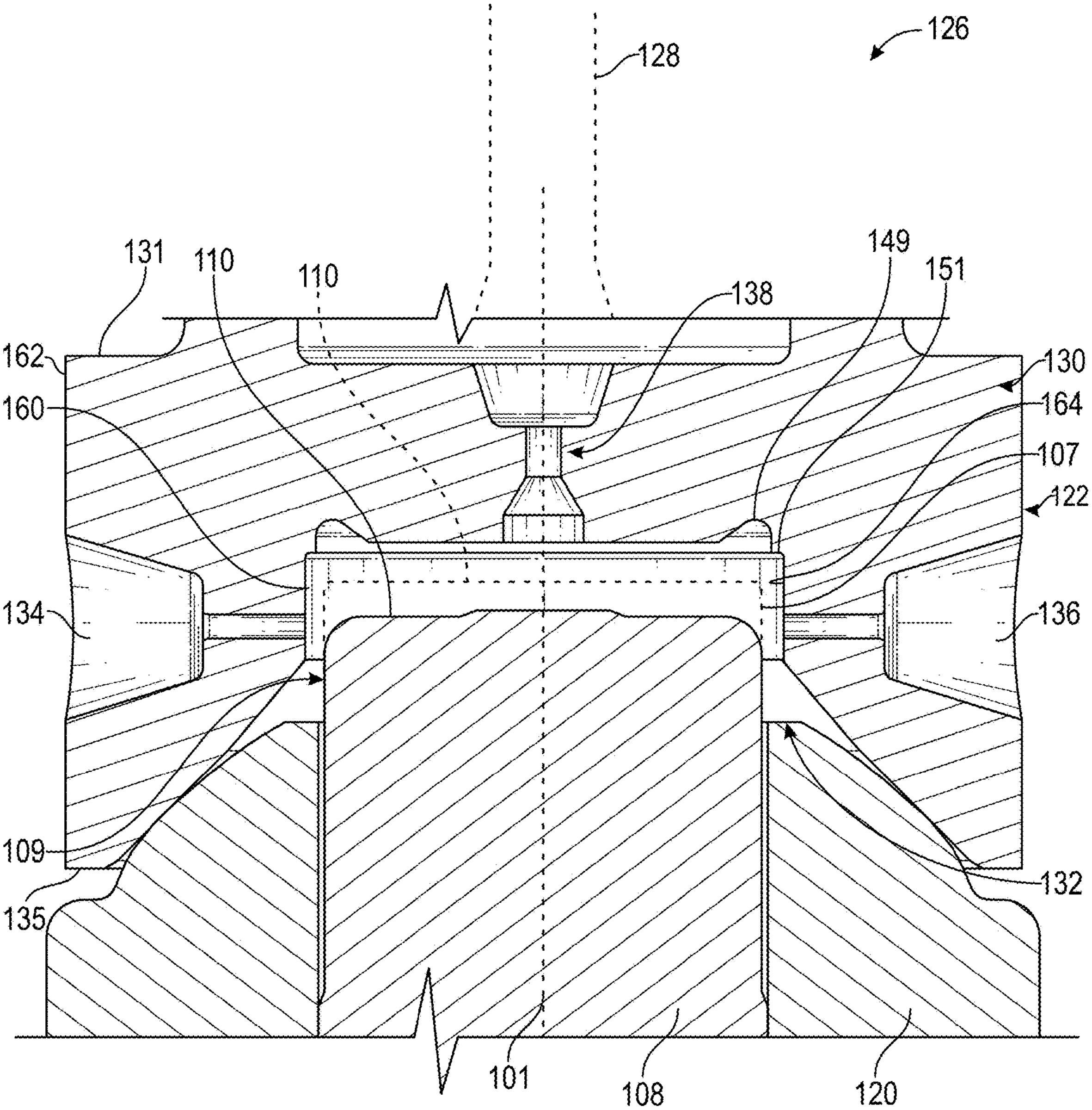
FIG. 3 is a sectional view illustrating certain aspects of a needle seal and needle interface of the fuel injector in FIG. 2.

For example, with reference to FIG. 3, in response to a fuel injection event, the needle 108 moves proximally into needle seal 122 as indicated by dotted line 107 showing the displaced proximal end 110 of the needle 108. This displacement lifts the needle tip 116 off of the needle seat 114 to inject a mist of fuel from the injector body 102. This proximal movement of the needle 108 into the needle seal 122 is reversed when the fuel injection event is terminated by fuel inflow into the needle seal 122 that displaces the needle 108 distally to engage the needle tip 116 with needle seat 114.

Figure 4:
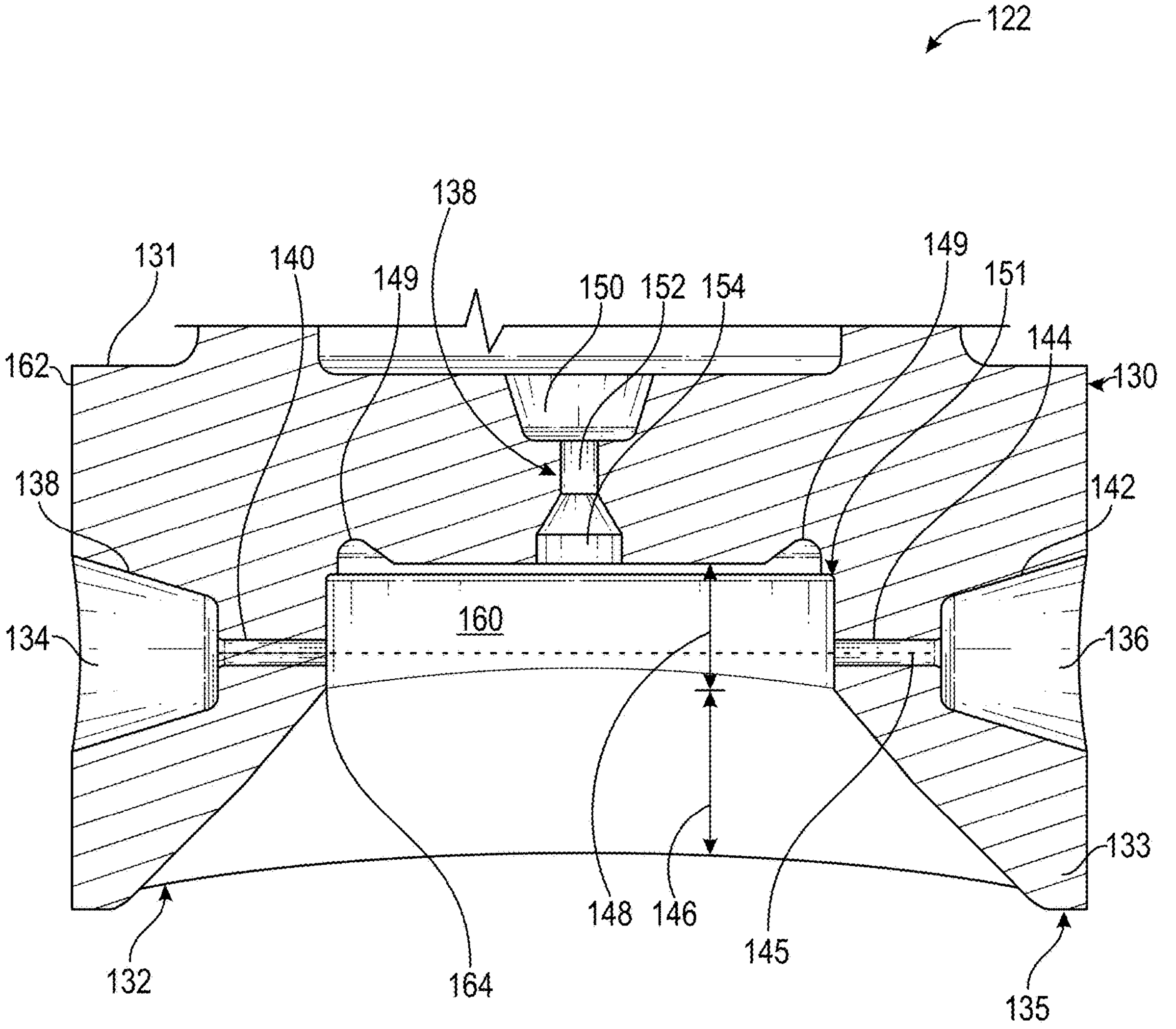
FIG. 4 is a sectional view illustrating further aspects of the needle seal in FIG. 3.

Referring further to FIG. 4, in the illustrated example embodiment, the needle seal 122 includes a cylindrical body 130 having a proximal end wall 131 and an opposite distal side 135. Body 130 includes a sidewall 133 between proximal end wall 131 and distal side 135 that extends around an inner cavity 132 forming a control volume 160. The needle seal 122 includes multiple inlet orifices defined by sidewall 133 that open into the control volume 160, such as a first inlet orifice 134 and a second inlet orifice 136. Control volume 160 extends proximally from the orifices 134, 136 and receives the proximal end 110 of the needle 108. Pressurized fuel flows into and out of control volume 160 to control the displacement of needle 108 in needle seal 122.

Inlet orifices 134, 136 extend from an outer surface 162 of the sidewall 133 to an inner surface 164 of sidewall 133 and are in fluid communication with control volume 160. An outlet orifice 138 extends longitudinally through the proximal end wall 131 of the needle seal 122 and is axially aligned with the fuel flow passage 128 and fuel passage 106 along longitudinal axis 101. The outlet orifice 138 is in fluid communication with the fuel flow passage 128 and opens into the control volume 160. Outlet orifice 138 is perpendicularly aligned with the inlet orifices 134, 136 in the illustrated embodiment.

In an example embodiment, fuel flows into the first inlet orifice 134 and the second inlet orifice 136 equally so that the incoming fuel imparts a net zero lateral against the proximal part of the needle seal 122 located in the control volume 160 as the needle 108 is displaced distally. Since fuel flows through the first inlet orifice 134 and the second inlet orifice 136 in a lateral direction and the resulting forces are laterally balanced, the needle 108 is centered towards or maintained along longitudinal axis 101 of the injector body 102.

The first inlet orifice 134 includes an outer part 138 and an inner part 140. The outer part 138 has a frusto-conical shape that is tapered inwardly from an outer surface 162 of the sidewall 133 towards the cavity 132. The inner part 140 extends between the outer part 138 and the cavity 132. Inner part 140 has a cylindrical shape extending from the outer part 138 to the inner surface 164 at control volume 160.

The second inlet orifice 136 also includes an outer part 142 and an inner part 144. The outer part 142 has a frusto-conical shape that is tapered inwardly from the outer surface 162 of sidewall 133 towards the cavity 132. The inner part 144 extends between the outer part 142 and the cavity 132. Inner part 144 has a cylindrical shape extending from the outer part 142 to the inner surface 162 at control volume 160.

In some embodiments, the first inlet orifice 134 and the second inlet orifice 136 are located on opposite lateral sides of sidewall 133. In an embodiment, orifices 134, 136 are spaced apart on the cylindrical body 130 by 180 degrees on opposite lateral sides of the cylindrical body 130. In an embodiment, the opposite lateral positioning of the first inlet orifice 134 and the second inlet orifice 136 aligns the orifices 134, 136 along a common axis 145. In an embodiment, common axis 145 and/or the orifices 134, 136 are perpendicularly oriented to longitudinal axis 101.

In some embodiments, the needle seal 122 may include two or more inlet orifices identical in size and shape. In some embodiments, the two or more inlet orifices may be placed axially along the same plane on the cylindrical body 130 and located symmetrically about the sidewall 133 of the cylindrical body 130. In some embodiments, the two or more inlet orifices are configured to allow equal fuel flow so that forces from the fuel flowing into the needle seal 122 are balanced laterally on the proximal end 110 of the needle 108 located in control volume 160. In an embodiment, the inlet orifices 134, 136 are formed by a micro-honing or laser drilling processes to precisely control and equally size the openings formed by the inlet orifices.

The cavity 132 forms a radially inwardly tapered opening into cylindrical body 130 from distal side 135 in fluid communication with control volume 160. The tapered opening at distal side 135 is oriented toward sleeve 120. In an embodiment cavity 132 includes a frusto-conical distal part 146 formed by inner surface 164, and an adjoining cylindrical proximal part 148 formed by inner surface 164 that receives the proximal end 110 of the needle 108. The cylindrical proximal part 148 includes the outlets for the inlet orifices 134, 136, and proximal part 148 extends from the distal part 146 to the proximal end wall 131 of the body 130.

The proximal end wall 131 may include one or more recesses 149 in communication with the cavity 132 to increase the control volume 160 for housing pressurized fuel. The cavity 132 may further include a 360 degree scallop cutout 151 formed by inner surface 164 between the recesses 149 and the distal part 146 to increase the volume of proximal part 148 and balance the flow around the needle 108 while providing additional control volume and reduce flow restrictions. Cutout 151 also increases a space between outer surface 109 of needle 108 and the outlets of the inlet orifices 134,136.

The axial orifice 138 extends through the proximal end wall 131 of the body 130, and includes an outer part 150, a middle part 152, and an inner part 154. The outer part 150 has a frusto-conical shape that is tapered inwardly towards the cavity 132. The middle part 152 has a cylindrical shape and is fluidly coupled between the outer part 150 and the inner part 154. The inner part 154 is fluidly coupled between the middle part 152 and the cavity 132. A cone-shaped portion of the inner part 154 extends from the middle part 152 into a cylindrically-shaped portion of the inner part 154 that extends to the cavity 132.

Further written description of a number of example embodiments shall now be provided. One example embodiment is a fuel injector that includes an elongated injector body defining a longitudinally extending fuel passage therein. An elongated needle is located in the fuel passage of the injector body, and the elongated needle extends between a proximal end and an opposite distal end. The elongated needle is longitudinally movable in the fuel passage to selectively stop and start fuel injection from the fuel passage. A sleeve is positioned around an outer surface of the needle adjacent the proximal end. A check valve assembly maintains pressurized fuel in the fuel passage and permits fuel flow out of the fuel passage in response to a fuel injection event. A needle seal is located between the check valve assembly and the sleeve, and the needle seal is positioned around the proximal end of the needle. The needle seal includes a first inlet orifice and an opposite second inlet orifice for receiving a fuel flow therethrough in response to the fuel injection event.

In certain embodiments of the foregoing fuel injector, the first inlet orifice is spaced 180 degrees opposite the second inlet orifice. In certain embodiments, the fuel flow form the fuel passage through first and second inlet orifices is balanced against the needle, resulting in lateral load on the needle that is effectively reduced or eliminated. In an embodiment, the orifices are configured so that a net zero force is applied on the proximal end of the needle.

In certain embodiments, the first and second inlet orifices of the needle seal are located so that fuel flow through the first and second inlet orifices is directed against opposite lateral sides of the needle. In certain embodiments, fuel flow into the needle seal through the first and second inlet orifices applies a net force in a lateral direction that maintains the needle toward or along a center axis of the injector body.

In certain embodiments, the check valve assembly includes a check valve that opens in response to a fuel injection event to allow the needle to move into the needle seal.

In certain embodiments, the needle seal includes a cylindrical body with a control volume to receive the proximal end of the needle and also received fuel flow from the first and second inlet orifices. In certain forms, the cylindrical body defines a tapered opening into the control volume and the tapered opening is oriented toward the sleeve. In certain embodiments, each of the first and second inlet orifices are defined by a sidewall of the needle, and the sidewall includes an outer part with an inwardly tapering frusto-conical shape and an inner part with a cylindrical shape extending from the outer part to a control volume of the needle seal.

Another example embodiment is a needle seal for a needle of a fuel injector. The needle seal includes a cylindrical body having a distal side and a proximal wall opposite the distal side. The cylindrical body includes a sidewall defining a control volume that receives a proximal end of the needle. The distal side of the sidewall has an opening into the control volume. The proximal wall includes an outlet orifice in fluid communication with the control volume. The sidewall includes multiple inlet orifices therethrough that each open into the control volume.

In certain embodiments of the foregoing needle seal, the control volume forms an interior cavity in the cylindrical body. The interior cavity is defined by an interior surface of the sidewall. The interior surface includes a frusto-conical distal part and an adjoining cylindrical proximal part. In certain embodiments, the sidewall defines each of the inlet orifices, and the sidewall includes an outer part with an inwardly tapering frusto-conical shape extending from an outer surface of the sidewall to an inner part with a cylindrical shape extending from the outer part to the interior surface.

In certain embodiments, a first inlet orifice is spaced about the cylindrical body 180 degrees opposite a second inlet orifice. In certain embodiments, the inlet orifices are configured so that fuel flow into the needle seal results in a net zero force lateral being applied on the proximal end of the needle.

In certain embodiments, the multiple inlet orifices include first and second inlet orifices that extend through opposite lateral sides of the cylindrical body and are aligned along a common axis. In certain embodiments, the needle seal includes more than two inlet orifices. In certain embodiments, the outlet orifice is perpendicularly aligned with the multiple inlet orifices.

Another example embodiment is a fuel injection system comprising a common fuel rail, and at least one fuel injector in fluid communication with the fuel rail. The fuel injector includes an elongated injector body defining a longitudinally extending fuel passage therein. An elongated needle is located in the fuel passage of the injector body, and the elongated needle has a proximal end and an opposite distal end. The elongated needle is longitudinally movable in the fuel passage to selectively stop and start fuel injection from the fuel passage. A sleeve is positioned around an outer surface of the needle adjacent the proximal end of the needle. A check valve assembly maintains pressurized fuel in the fuel passage and permits fuel flow out of the fuel passage in response to a fuel injection event. A needle seal is located between the check valve assembly and the sleeve. The needle seal is positioned around the proximal end of the needle. The needle seal includes multiple inlet orifices for receiving a fuel flow therein during the fuel injection event.

In certain embodiments of the foregoing system, pressurized fuel from the fuel rail flows equally through the first and second inlet orifices so that a net zero force is applied on the proximal end of the needle.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A fuel injector, comprising:

an elongated injector body defining a longitudinally extending fuel passage therein;

an elongated needle in the fuel passage of the injector body, the elongated needle including a proximal end and an opposite distal end, the elongated needle being longitudinally movable in the fuel passage to selectively stop and start fuel injection from the fuel passage;

a sleeve positioned around an outer surface of the needle adjacent the proximal end;

a check valve assembly configured for maintaining pressurized fuel in the fuel passage and permitting fuel flow out of the fuel passage in response to a fuel injection event; and a needle seal between the check valve assembly and the sleeve, wherein the needle seal is positioned around and configured to receive the proximal end of the needle, the needle seal including a first inlet orifice and an opposite second inlet orifice sharing a common axis for receiving a fuel flow therethrough in response to the fuel injection event.

2. The fuel injector of claim 1, wherein the first inlet orifice of the needle seal is spaced 180 degrees opposite the second inlet orifice of the needle seal.

3. The fuel injector of claim 1, wherein fuel flow from the fuel passage of the injector body through the first and second inlet orifices applies a net zero force on the proximal end of the needle.

4. The fuel injector of claim 1, wherein the first and second inlet orifices are located about the needle seal so that fuel flow through the first and second inlet orifices is directed against opposite lateral sides of the needle.

5. The fuel injector of claim 1, wherein fuel flow into the needle seal through the first and second inlet orifices maintains the needle toward a center longitudinal axis of the injector body.

6. The fuel injector of claim 1, wherein the check valve assembly includes a check valve that is configured to open in response to a fuel injection event to allow the needle to move into the needle seal.

7. The fuel injector of claim 1, wherein the needle seal includes a cylindrical body defining a control volume that receives the proximal end of the needle and also receives fuel flow from the first and second inlet orifices.

8. The fuel injector of claim 7, wherein the cylindrical body defines a tapered opening into the control volume that is oriented toward the sleeve.

9. The fuel injector of claim 1, wherein the first and second inlet orifices are each defined by a sidewall of the needle seal, and for each of the first and second inlet orifices the sidewall includes an outer part with an inwardly tapering frusto-conical shape and an inner part with a cylindrical shape extending from the outer part to a control volume of the needle seal.

10. A needle seal for a needle of a fuel injector, the needle seal comprising:

a cylindrical body having a distal side and a proximal wall opposite the distal side, the cylindrical body including:

a sidewall defining a control volume for receiving a proximal end of the needle, the distal side of the sidewall having an opening into the control volume;

an outlet orifice through the proximal wall that is in fluid communication with the control volume; and multiple inlet orifices through the sidewall, wherein each of the multiple inlet orifices opens into the control volume.

11. The needle seal of claim 10, wherein the control volume is formed by an interior cavity in the cylindrical body, the interior cavity being defined by an inner surface of the sidewall, the inner surface including a frusto-conical distal part and a cylindrical proximal part that adjoins the frusto-conical distal part.

12. The needle seal of claim 11, wherein the proximal part of the inner surface forms a 360 degree scallop cutout around the control volume, wherein the cutout is in communication with the multiple inlet orifices.

13. The needle seal of claim 10, wherein the sidewall of the cylindrical body defines each of the multiple inlet orifices, and for each of the multiple inlet orifices the sidewall includes an outer part with an inwardly tapering frusto-conical shape that extends from an outer surface of the sidewall to an inner part of the sidewall, and the inner part extends from the outer part to an inner surface of the sidewall, the inner part having a cylindrical shape extending from the outer part to the inner surface.

14. The needle seal of claim 10, wherein the multiple inlet orifices includes a first inlet orifice that is spaced about the cylindrical body 180 degrees opposite a second inlet orifice.

15. The needle seal of claim 10, wherein the multiple inlet orifices are configured so that fuel flow into the needle seal applies a net zero force on the proximal end of the needle.

16. The needle seal of claim 10, wherein the multiple inlet orifices include first and second inlet orifices that extend through opposite lateral sides of the sidewall of the cylindrical body, and the first and second inlet orificesare aligned along a common axis.

17. The needle seal of claim 10, wherein the cylindrical body includes more than two inlet orifices.

18. The needle seal of claim 10, wherein the outlet orifice is perpendicularly aligned with the multiple inlet orifices.

19. A fuel injection system, comprising:

a common fuel rail; and at least one fuel injector in fluid communication with the fuel rail, the fuel injector including:

an elongated injector body defining a longitudinally extending fuel passage therein;

an elongated needle in the fuel passage of the injector body, the elongated needle including a proximal end and an opposite distal end, the elongated needle being longitudinally movable in the fuel passage to selectively stop and start fuel injection from the fuel passage;

a sleeve positioned around an outer surface of the needle adjacent the proximal end;

a check valve assembly for maintaining pressurized fuel in the fuel passage and permitting fuel flow out of the fuel passage in response to a fuel injection event; and a needle seal between the check valve assembly and the sleeve, wherein the needle seal is positioned around and configured to receive the proximal end of the needle, the needle seal including a first inlet orifice and an opposite second inlet orifice sharing a common axis for receiving a fuel flow therethrough in response to the fuel injection event.

20. The fuel injection system of claim 19, wherein pressurized fuel from the fuel rail flows equally through the first and second inlet orifices so that a net zero force is applied on the proximal end of the needle by the fuel flowing into the needle seal from the fuel passage.

* * * * *